W. J. HOBSON.
Corn-Planter.
No. 62,200.
Patented Feb. 19. 1867.
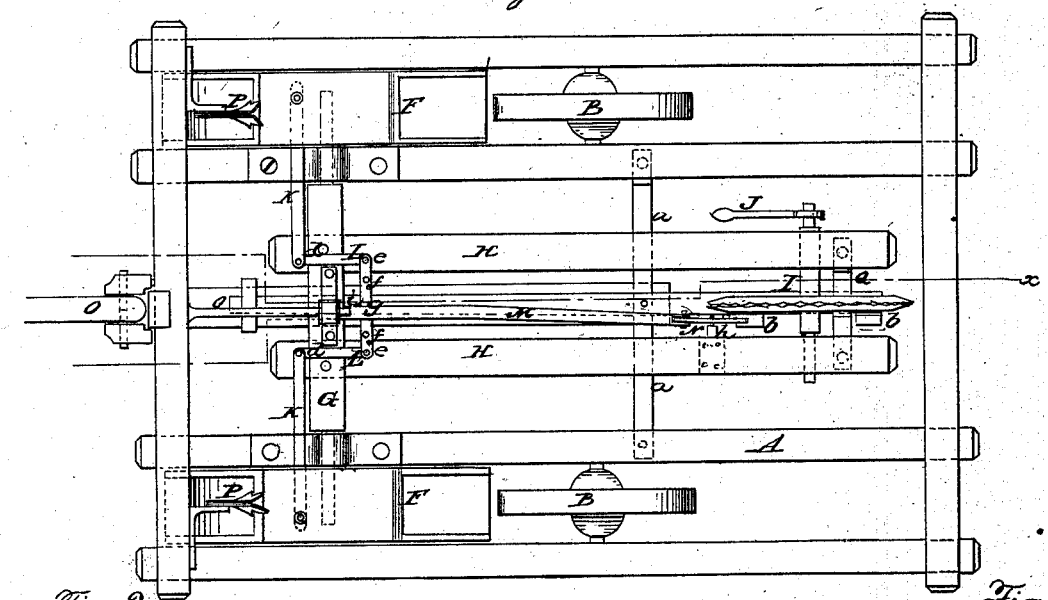
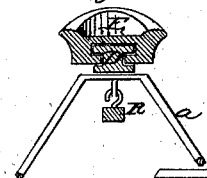
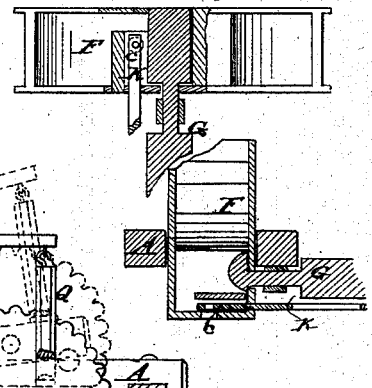
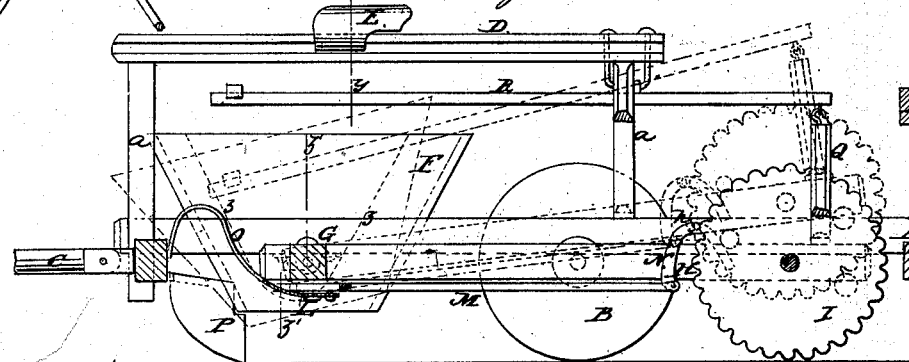

United States Patent Office.

W. J. HOBSON, OF SAVANNAH, MISSOURI.

Letters Patent No. 62,200, dated February 19, 1867.

IMPROVEMENT IN CORN PLANTERS.

The Schedule referred to in these Letters Patent and making part of the same.

TO ALL WHOM IT MAY CONCERN:

Be it known that I, W. J. HOBSON, of Savannah, in the county of Andrew, and State of Missouri, have invented a new and improved Corn Planter; and I do hereby declare that the following is a full, clear, and exact description thereof, which will enable others skilled in the art to make and use the same, reference being had to the accompanying drawings, forming part of this specification.

This invention relates to a new and improved corn planter, of that class which are designed for planting the corn or seed in check rows. The invention consists in a novel and improved seed-dropping mechanism, the arranging and operating of the same, as hereinafter fully shown and described, whereby the machine may be used on rough or uneven ground, and the seed dropped or planted in check rows without the previous furrowing of the ground. In the accompanying drawings—

Figure 1 is an inverted plan of my invention.
Figure 2, a side sectional view of the same, taken in the line $x$ $x$, fig. 1.
Figure 3, a transverse vertical section of a portion of the same, taken in the line $y$ $y$, fig. 2.
Figure 4, a section of one of the seed-boxes, taken in the line $z$ $z$, fig. 2.
Figure 5, a transverse vertical section of fig. 4, taken in the line $z'$ $z'$, fig. 2.

Similar letters of reference indicate like parts.

A is a rectangular frame mounted on the wheels B B, and having a draught-pole, C, attached, and D is a horizontal bar, which is secured to supports, $a$, on the frame A, the bar D being some distance above the frame A. The bar D is grooved longitudinally at each side, and the driver's seat, E, is fitted on the bar D and in the grooves thereof, as shown clearly in fig. 3. By this arrangement the driver's seat may be adjusted further forward or backward, as occasion may require. F F represent two seed-boxes, which are placed in the frame A, one in front of each wheel B. These seed-boxes are attached to a shaft, G, which has its bearings at the under side of the frame A. To this shaft G there are secured two parallel bars, H, between the rear parts of which there is fitted a wheel, I, having a sharp serrated or notched edge. One side of the wheel I has two rollers, $b$ $b$, attached to it, and at one end of the axle of said wheel there is secured an arm, J, which serves as a marker. In the lower part of each seed-box F there is fitted a sliding bar, K. These bars are each perforated with a hole, $c$, near their outer ends, and the inner ends of these bars are connected by pivots, $d$, to one end of right-angular levers, L L, the fulcrum pins $e$ of which pass into the under sides of the bars H; the opposite ends of the levers L L being connected by pivots, $f$, to the ends of a cross-bar, $g$, on a rod, M, between the bars H H and parallel therewith. The rear end of the rod M is pivoted to one end of a V-shaped lever, N, the fulcrum of which is on an arm, $h$, attached to one of the bars H. This lever N is within the path of the rotation of the rollers, and the latter will consequently, as the machine is drawn along, actuate the lever N and rod M in one direction, and said parts are thrown back or operated in the opposite direction by a spring, O, attached to the front end of the rod M and the frame A. This reciprocating movement of the rod M imparts, through the medium of the right-angular levers L L, a reciprocating movement to the bars K, by which the seed is discharged from the seed-boxes F F, substantially in the same way as the generality of reciprocating seed-slides. To the front end of the frame A, and directly in front of each seed-box F, there is attached a furrow opener, P, and to the rear parts of the bars H H there is secured a metal yoke, Q, to which the rear end of the treadle R is connected. The driver, by actuating this treadle, may at any time raise the wheel I from the surface of the ground and render the seed-distributing device inoperative. In consequence of having the wheel I fitted between the bars H H, and the latter attached to a shaft, G, which is allowed to turn in its bearings, and which has the seed-boxes F secured to it, it will be seen that the wheels B and rectangular frame A are allowed to rise and fall to conform to the inequalities of surface over which they may pass. This is an important feature of the invention. By having the wheel I serrated at its edge, it is prevented from slipping, which is an important feature, as the wheel I is rotated by traction only. The marker J enables the driver to start the device right at the commencement of rows, in order that the corn may be dropped evenly in both directions, or in "check rows," as it is commonly termed.

What I claim as new, and desire to secure by Letters Patent, is—

1. The wheel I, provided with a sharp serrated edge, and fitted between bars H H, attached to a shaft, G, to which the seed-boxes F are secured, substantially as and for the purpose specified.

2. The operating of the seed-distributing bars K, from the wheel I, through the medium of the rollers $b\ b$ attached thereto, the □-shaped lever N attached to the rod M, the spring O, and right-angular levers L L, all arranged to operate substantially in the manner as shown and described.

3. The marker J attached to the axis of the wheel I, when used in combination with the seed-dropping mechanism, constructed and arranged as set forth.

4. The treader R applied to the rear parts of the bars H H, and arranged in relation with the driver's seat substantially as and for the purpose specified.

W. J. HOBSON.

Witnesses:
C. J. HOBSON,
ROBT. CONOVER.